(12) United States Patent
Trieschmann et al.

(10) Patent No.: US 8,561,589 B2
(45) Date of Patent: Oct. 22, 2013

(54) GEAR AND BALANCE SHAFT FOR A PISTON ENGINE

(75) Inventors: Jörg Trieschmann, Heringen (DE); Roland Nagler, Seebach (DE); Andreas Nagler, legal representative, Seebach (DE)

(73) Assignee: MITEC Automotive AG, Deutschland (DE)

( * ) Notice: Subject to any disclaimer, the term of this patent is extended or adjusted under 35 U.S.C. 154(b) by 54 days.

(21) Appl. No.: 13/109,768

(22) Filed: May 17, 2011

(65) Prior Publication Data

US 2011/0247581 A1 Oct. 13, 2011

Related U.S. Application Data

(63) Continuation of application No. PCT/EP2009/008185, filed on Nov. 18, 2009.

(30) Foreign Application Priority Data

Nov. 19, 2008 (DE) .......................... 10 2008 057 947
Jul. 14, 2009 (EP) ...................................... 09009141

(51) Int. Cl.
*F02B 75/06* (2006.01)

(52) U.S. Cl.
USPC ..................................... 123/192.2; 123/192.1

(58) Field of Classification Search
USPC ....................................................... 123/192.2
See application file for complete search history.

(56) References Cited

U.S. PATENT DOCUMENTS

| | | | |
|---|---|---|---|
| 3,860,457 A * | 1/1975 | Vourinen et al. | 148/614 |
| 4,222,793 A * | 9/1980 | Grindahl | 148/544 |
| 4,509,474 A | 4/1985 | Schmuck | |
| 5,156,068 A | 10/1992 | Moller | |
| 5,207,112 A * | 5/1993 | Sweetland et al. | 74/460 |
| 5,884,599 A * | 3/1999 | Shiozaki et al. | 123/192.2 |
| 6,258,180 B1 | 7/2001 | Wilde et al. | |

(Continued)

FOREIGN PATENT DOCUMENTS

| | | |
|---|---|---|
| CN | 101072890 A | 11/2007 |
| CN | 101196139 A | 6/2008 |

(Continued)

OTHER PUBLICATIONS

Anchor Bronze & Metals, Inc., Http://www.anchorbronze.com/durabargears.htm 1999.*

*Primary Examiner* — Noah Kamen
(74) *Attorney, Agent, or Firm* — Bose McKinney & Evans LLP

(57) ABSTRACT

Balance shaft for a piston engine comprises a bearing journal, on which the balance shaft is supported, a gear section, on which a gear is connected in a rotation-locked manner thereto via a press fit or another shaft-hub-connection, and an unbalanced section having an integrally connected unbalanced mass or an unbalanced mass fastened on this unbalanced section using machine elements or via another shaft-hub connection. The balance shaft can alternately comprise steel or cast iron material in the case of a friction mounting and its bearing journals can alternately be implemented as hardened or also unhardened. If the balance shaft is mounted in roller bearings and if the roller bodies have direct contact with the bearing surface, it is implemented in a suitable steel and the bearing journals are hardened. The gear comprises nodular cast iron and is not hardened.

35 Claims, 7 Drawing Sheets

(56) References Cited

U.S. PATENT DOCUMENTS

| | | | |
|---|---|---|---|
| 7,296,533 B2 * | 11/2007 | Ishii et al. | 118/723 MW |
| 7,296,553 B2 * | 11/2007 | Osman | 123/192.2 |
| 2007/0261657 A1 | 11/2007 | Marzy et al. | |
| 2009/0047164 A1 | 2/2009 | Menk et al. | |

FOREIGN PATENT DOCUMENTS

| | | | |
|---|---|---|---|
| DE | 39 29 804 A1 | | 3/1991 |
| DE | 10 2006 029 554 A1 | | 12/2007 |
| EP | 0 076 358 A1 | | 3/1982 |
| EP | 0 453 723 A1 | | 2/1991 |
| EP | 1 440 748 A1 | | 7/2004 |
| JP | 58019403 A | * | 2/1983 |
| JP | 61096054 A | * | 5/1986 |
| JP | 61119351 A | * | 6/1986 |
| JP | 61133360 A | * | 6/1986 |
| JP | 61210151 A | * | 9/1986 |
| JP | 63-45239 U | | 3/1988 |
| JP | 63282237 A | * | 11/1988 |
| JP | 01152240 A | * | 6/1989 |
| JP | 5-93225 A | | 4/1993 |
| JP | 06108199 A | * | 4/1994 |
| JP | 9-68261 A | | 3/1997 |
| JP | 10096041 A | * | 4/1998 |
| JP | 11006026 A | * | 1/1999 |
| JP | 2000-346177 A | | 12/2000 |
| JP | 2001159423 A | * | 6/2001 |
| JP | 2003105437 A | * | 4/2003 |
| JP | 2004-223608 A | | 8/2004 |
| KR | 1991-0004983 | | 7/1991 |
| KR | 2002046534 A | * | 6/2002 |
| KR | 681270 B1 | * | 2/2007 |

* cited by examiner

GEAR AND BALANCE SHAFT FOR A PISTON ENGINE

RELATED APPLICATIONS

This application is a continuation of PCT/EP2009/008185, filed Nov. 18, 2009, which claims priority to DE 102008057947.5, filed Nov. 19, 2008 and also claims priority to EP09009141.4, filed Jul. 14, 2009, all of which are hereby incorporated herein by reference in their entireties.

BACKGROUND

The present invention relates to a balance shaft having a gear for a piston engine, having a bearing journal, a gear section, and an unbalanced section.

In modern piston engines, balance shafts are used in order to compensate for occurring vibrations and imbalances of the engine. The free mass forces and free mass torques which occur in single cylinder piston engines or in multi-cylinder piston engines are reduced or compensated for by the balance shafts.

It is typical to implement these balance shafts as forged parts. The forged parts are semifinished shafts on which the gears for driving the balance shaft are forged, so that they are connected to the balance shafts. Alternatively, the gears can also be connected in a rotation-locked manner to the balance shaft via press fits or other shaft-hub-connections. This is also true for unbalanced masses on the balance shafts. These can also either be forged on or fastened on via press fits. In some embodiments, the unbalanced masses are also fastened using machine elements. Welding the unbalanced masses on the balance shafts is also known.

In the prior art, the bearing journal and the gearings, i.e., the gears of the shaft, are hardened. In some cases, the entire shaft is also case hardened, nitrided, or nitrocarburized. In most of the cases, the heat treatment is performed as induction hardening. The gears of the balance shaft are always hardened in the case of forged balance shafts.

Balance shafts made of cast iron are also known, on which gears made of steel are shrink-fitted. The bearing journals of these balance shafts are optionally inductively hardened. The gears made of steel are typically case hardened. In some cases the gear is inductively hardened.

Furthermore, the currently predominantly practiced mounting of the balance shafts in friction bearings is increasingly being either completely or partially replaced by roller mounting for the purpose of reducing internal-engine friction losses. Roller mounting of the balance shafts is implemented both in the balance shaft housings and also directly in the cylinder crankcase.

SUMMARY

These teachings provide an improved balance shaft which is cost-effective and is suitable in particular in combination with roller bearings for use in piston engines.

In one embodiment, the balance shaft for a reciprocating piston engine has a gear made of nodular cast iron and has at least one bearing journal on which the balance shaft is mounted. The gear (gearwheel) is connected in a rotation-locked manner to the balance shaft on at least one gear section of the shaft. An unbalanced mass is positioned on at least one unbalanced section.

In contrast to the previously known balance shafts, in which gears made of case-hardened or quenched-and-tempered steel having the respective adequate heat treatment are used, according to these teachings, a gear made of nodular cast iron is used. According to this disclosure, the cast iron has a material specification having chemical components and microstructure formation as specified below. A gear without conductive hardening of the gearing is particularly preferably used.

In use, the gear of the balance shaft cooperates with a gear on the crankshaft or with intermediate gears positioned between balance shaft and crankshaft. Balance shafts are usually operated unloaded in internal combustion engines, although an oil pump or also a water pump is driven in a few cases; nonetheless, short-term torques and forces of significant magnitude arise, which act on the balance shaft. The rotational irregularity of the internal combustion engines induces these torques, together with the mass inertia intrinsic to the balance shafts. Load peaks sometimes occur, which particularly act on the gear of the balance shaft and can be very high.

In one embodiment, the gearwheel made of spheroidal graphite cast iron (nodular cast iron) is fastened on the balance shaft via a press fit or via other shaft-hub-connections which are known to those skilled in the art. The balance shaft and the gear are therefore two independent elements which are joined during the production process. The balance shaft can therefore comprise a different material than the gear.

In the context of the invention, a press fit is understood as a mechanical connection technique in which an interference fit occurs after the joining and longitudinal and lateral forces are transmitted in a friction-locked manner. A shaft-hub-connection is understood as a type of connection in which torques and powers are transmitted to a hub, but also axial forces, lateral forces, and bending torques as are induced by helical gearings of gears.

The balance shaft is preferably produced from steel or from a roller bearing steel having a high carbon component, for example, at least 0.5%. Such a balance shaft is preferably supported via a friction bearing, particularly preferably via a roller bearing. The bearing journals (bearing points) may be inductively hardened when mounting in a roller bearing. If roller bearings whose roller bodies run directly on the balance shaft bearing journals (bearing points) are used, the use of steel made of shaft material having an inductively hardened raceway is therefore indispensable. The raceway is the outer surface or lateral surface of the shaft which has contact with the roller bodies of the roller bearing. The use of nodular cast iron as a shaft material, even having inductively hardened raceway, is not durable in this case.

The unbalanced mass is advantageously installed on the unbalanced section of the balance shaft using a known connection technique via a form fit or alternatively in a friction-locked manner. The imbalance mass is preferably integrally formed on the shaft.

In one exemplary embodiment, the balance shaft and the gear are produced from the same material. They both comprise nodular cast iron. The material properties may have the below-mentioned preferred specifications for both elements.

The bearing journal of the balance shaft made of nodular cast iron can be implemented as unhardened and the entire balance shaft can be unhardened.

In an exemplary embodiment, the balance shaft and the gear are integrally foamed. Both are produced from cast iron. The gear is also directly cast as a part of the balance shaft during the production (primary forming) of the integral balance shaft. Subsequent processes, such as welding on or shrink-fitting gears, are eliminated. Furthermore, the precise machining at the joint points of the individual components is eliminated in the case of the integral (one-piece) embodiment of the balance shaft with gearwheel. In the context of the invention, it was established that this balance shaft can be produced in comparatively few processes. It is simultaneously possible to achieve a very high precision of the shaft, in particular the functionally-important parts which enclose the gear. Only low costs therefore arise for the primary forming. It was also recognized that such a balance shaft has a high carrying capacity, which makes it particularly suitable for use in piston engines.

In one embodiment, the gear in the gear section of the balance shaft is unhardened. The hardening procedure is therefore also eliminated during the production, which makes the gear and therefore the balance shaft as a whole very cost-effective.

It has been found by the inventors that the function and durability of the gears and/or the balance shaft, if unhardened nodular cast iron is used, are strongly dependent on the selection of the basic microstructure. The inventors have also established that a high fracture elongation and high fracture toughness as well as good wear behavior can be achieved by a suitable selection of the components of the cast iron. The gears having a suitable microstructure withstand the occurring loads or load peaks even when driven directly by the crankshaft. A suitable composition of the cast iron has a carbon component of 2.90 to 3.80 mass percent. A carbon component of 3.20 to 3.70 mass percent is preferred, a component of 3.35 to 3.65 mass percent carbon being classified as particularly preferred. The suitable microstructure has a mass component of 1.5 to 3.5 mass percent of silicon, preferably 2.2 to 3.5 mass percent, and particularly preferably 2.5 to 3.3 mass percent. The silicon component can be selected additionally to or independently of the carbon component.

Furthermore, it has proven to be advantageous if the employed cast iron has a sulfur component which is at most 0.015 mass percent. The sulfur component is preferably less than 0.01 mass percent. The component of magnesium in the cast iron is to be between 0.025 and 0.07 mass percent; a component between 0.025 and 0.05 mass percent is preferred. The copper component is to be greater than 0.5 mass percent, preferably in the range between 0.5 and 1.1 mass percent.

In order to produce suitable wear behavior of the gears and/or the balance shaft, a specific microstructure is to be produced in the nodular cast iron. The inventors have recognized that the perlite component of the microstructure is at least 60%. The ferrite component of this microstructure is at most 40%. In order to achieve particularly high wear resistance, the microstructure of the cast iron preferably has a perlite component of 80-90% and preferably has a ferrite component of 10 to 20%. Hardness values of the gears and/or the balance shaft of 200 to 300 HB may thus be set. The achievable hardness HB is preferably in the range of 240 to 290 HB, preferably at a distance of at least 4 mm in the perpendicular direction from the lateral surface of the component (boundary distance≥4 mm).

The term "suitable wear behavior" is understood to mean a material configuration whose tensile strength is at least 600 N/mm², preferably at least 700 N/mm². The so-called yield strength $Rp_{0,2}$ is at least 380 N/mm², preferably at least 440 N/mm². The fracture elongation is at least 4%, preferably at least 8% to 10%, but in any case preferably no more than 12%.

The graphite formation and distribution within the cast iron has been shown to be a further influencing factor. The graphite particles and their distribution in shape and size should correspond to class VI/6 of the standard EN ISO 945-1994 or even more refined. The microstructure of the cast iron is therefore preferably implemented in such a manner that the greatest dimension of the graphite particles is less than 0.12 mm. The dimension is particularly preferably less than 0.08 mm. The properties of the gears can be improved still further if the greatest dimension of the spheroidal graphite particles in the cast iron is at most 0.06 mm. The most uniform possible distribution is preferred. Such microstructure qualities are particularly important for the high sliding speeds on the gearing (gearwheel) and on the bearing journals which occur in operation, in particular in the case of the simultaneous occurrence of high temperatures and low viscosity values of the oils used in the engine.

The gearwheel or gear and/or the balance shaft are distinguished by a fracture elongation of greater than 8%. This desired fracture elongation is achieved via targeted chemical composition of the cast iron. A manganese component of at most 0.5 mass percent is preferably provided in the cast iron. The manganese component is particularly preferably between 0.15 and 0.3 mass percent. Additionally or alternatively, the phosphorus component in the cast iron is to be limited to at most 0.05 mass percent. A mass component of at most 0.03 mass percent is preferred.

The fracture and stretching values, which are achieved by targeted chemical compositions and are elevated over "normal" (unalloyed) cast iron, particularly benefit the comparatively low durability parameters; in the gearwheel, these are the tooth base alternating bending resistance ($S_{Fe}$) and rolling durability ($S_{Hlim}$). The impact strains which occur during operation of the balance shaft result in deformations on the teeth of the gearwheel, which are essentially composed of the bending deformation of the teeth and the deformation because of Hertzian flattening of the tooth flanks. The high fracture elongation values of the material, in particular in combination with an unhardened gearing, particularly allow the requirements with respect to bending deformation of the teeth and the Hertzian flattening of the tooth flanks to be met. These mechanisms result in higher transmission capacity of the gearing, under the assumption of uniform tooth base alternating bending resistance and rolling durability (according to reference values from the literature).

The mechanical properties accompanying the above-described microstructure of the cast iron also allow, with suitable design of the gearing of the gearwheel, use of the balance shaft in high-performance gasoline engines and diesel engines, for example that have specific output of 70 kW/l (kilowatts/liter). The gear of the balance shaft therefore preferably has a toothing with higher addendum ratio ("high gearing"). This is understood to mean an implementation of the individual teeth of the gearwheel in such a manner that the tooth profile is significantly elevated in relation to a normal embodiment. The tooth profile height is typically at a dedendum factor greater than 1.25 and an addendum factor of greater than 1.0.

In addition to a linear gearing of the gear of the balance shaft, in which the tooth flanks extend parallel to the rotational axis of the gearwheel, a helical gearing has proven to be particularly positive. The gearing has a specified angle to the rotational axis of the gear which is not equal to zero and is preferably between 5° and 40°. The helical gearing of the gearwheel has a damping effect on the balance shaft based on the more uniform tooth engagement stiffness curve, so that occurring load peaks are additionally damped.

In embodiments incorporating these teachings, at least one gearwheel of the balance shaft is unhardened. This type of embodiment is contrary to the balance shafts implemented up to this point, in which a very great value was set on the wear resistance of the gearwheels, for example, by case hardening or induction hardening.

In connection with this invention, the terms "gearwheel" and "gear" also include the sprocket. An unhardened sprocket which is connected to the balance shaft is also a formfitting drive element which is driven by a chain wrapped around it, in contrast to a "normal" gearwheel, and does not engage directly in the driving drive element. Chain drives (formfitting envelope drives) are also used to drive balance shafts in reciprocating piston engines.

A piston engine according to exemplary embodiments has a crankshaft and a balance shaft, which is driven by the crankshaft, and which has a bearing journal on which it is mounted, and a gearwheel section, on which a gearwheel is connected in a rotation-locked manner to the balance shaft, for example, via a press fit or other shaft-hub-connections. The balance shaft has an unbalanced section, which carries an unbalanced mass, which is integrally formed on the shaft or is connected using one or more machine elements. The gearwheel of the shaft is produced from nodular cast iron. The shaft itself is preferably not produced from nodular cast iron, but rather comprises steel and is suitable for mounting in roller bearings. The balance shaft can comprise steel or a cast iron material in the case of a friction bearing and its bearing journals can be implemented as hardened or also unhardened. If the balance shaft is supported in roller bearings and if the roller bodies have direct contact with the bearing surface, the shaft must be comprised of a suitable steel and the bearing journals must always be hardened. The gearwheel is always composed of nodular cast iron and is not hardened.

In a piston engine according to exemplary embodiments, the balance shaft having the gearwheel can be installed in such a manner that the gearwheel engages in gearing incorporated on a crankshaft of the engine or in a gearwheel positioned on a crankshaft. The gearwheel can alternatively also engage in a gearwheel of a second balance shaft or can cooperate with a gearwheel of the crankshaft using a chain.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

Figure 1:
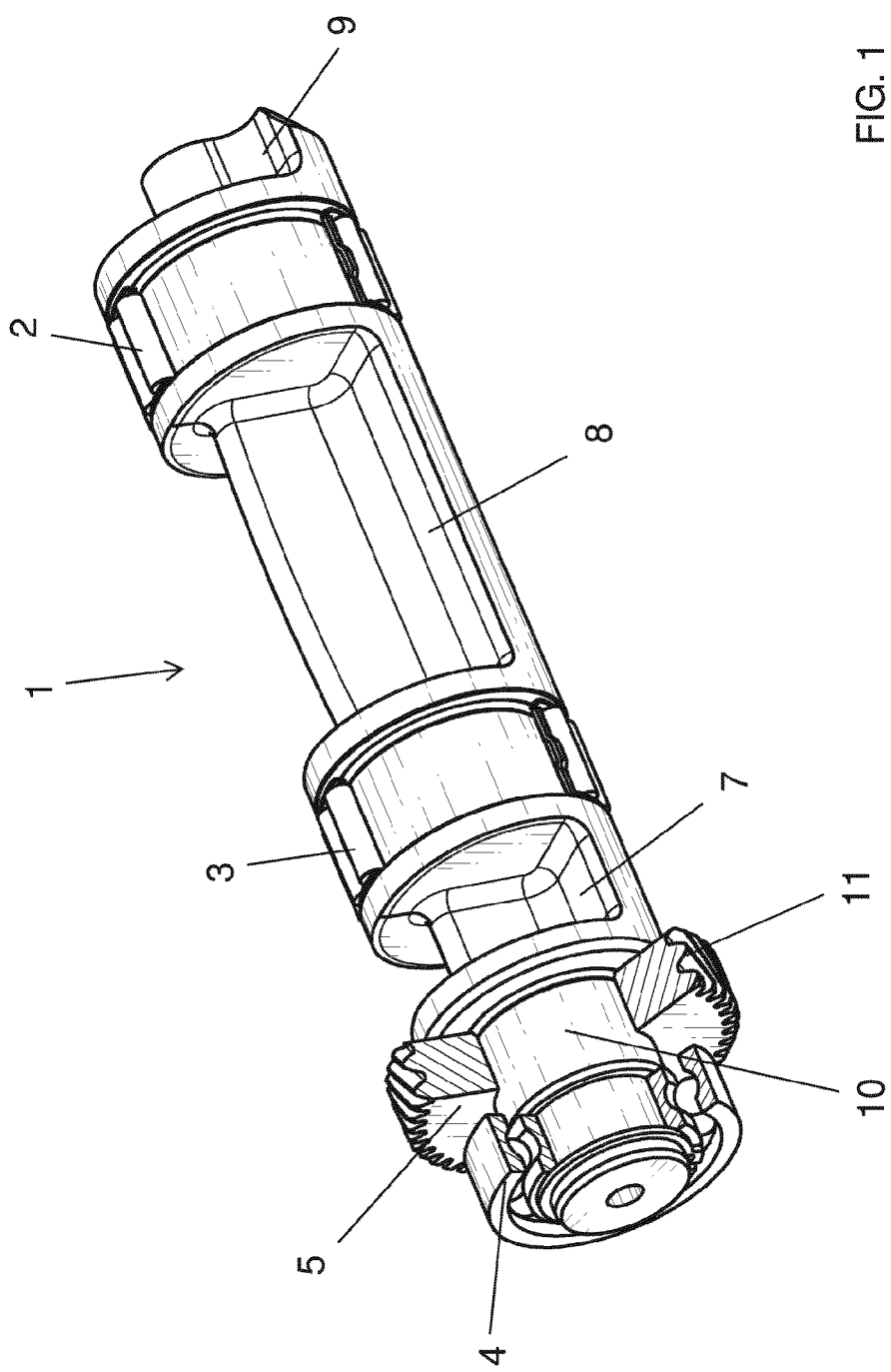
FIG. 1 shows on embodiment in a perspective view with portions removed of a balance shaft.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

A balance shaft 1 made of steel, in particular made of roller bearing steel having a carbon component of at least 0.5%, includes three bearing journals 2, 3, 4, three unbalanced sections 7, 8, 9, and a gearwheel section 10, in which a gearwheel (gear) 5 is positioned. The gearwheel 5 is connected in a rotation-locked manner to the balance shaft 1 via a press fit or other shaft-hub-connections. The bearing journal 4 and the gearwheel 5 are shown as a partial section for the illustration.

The balance shaft 1 is supported by three bearing journals 2, 3, 4 in a bearing housing. The axial positioning of the balance shaft 1 is ensured via the bearing 4.

It may be appreciated from FIG. 1 that the gearwheel 5, which is connected in a rotation-locked manner to the shaft via a press fit, has a gearing 11, which is implemented as a helical gearing; i.e., the flanks of the individual teeth are inclined at a predetermined angle, preferably an angle between greater than 0° and 45°, in relation to the rotational axis of the balance shaft 1.

Figure 2:
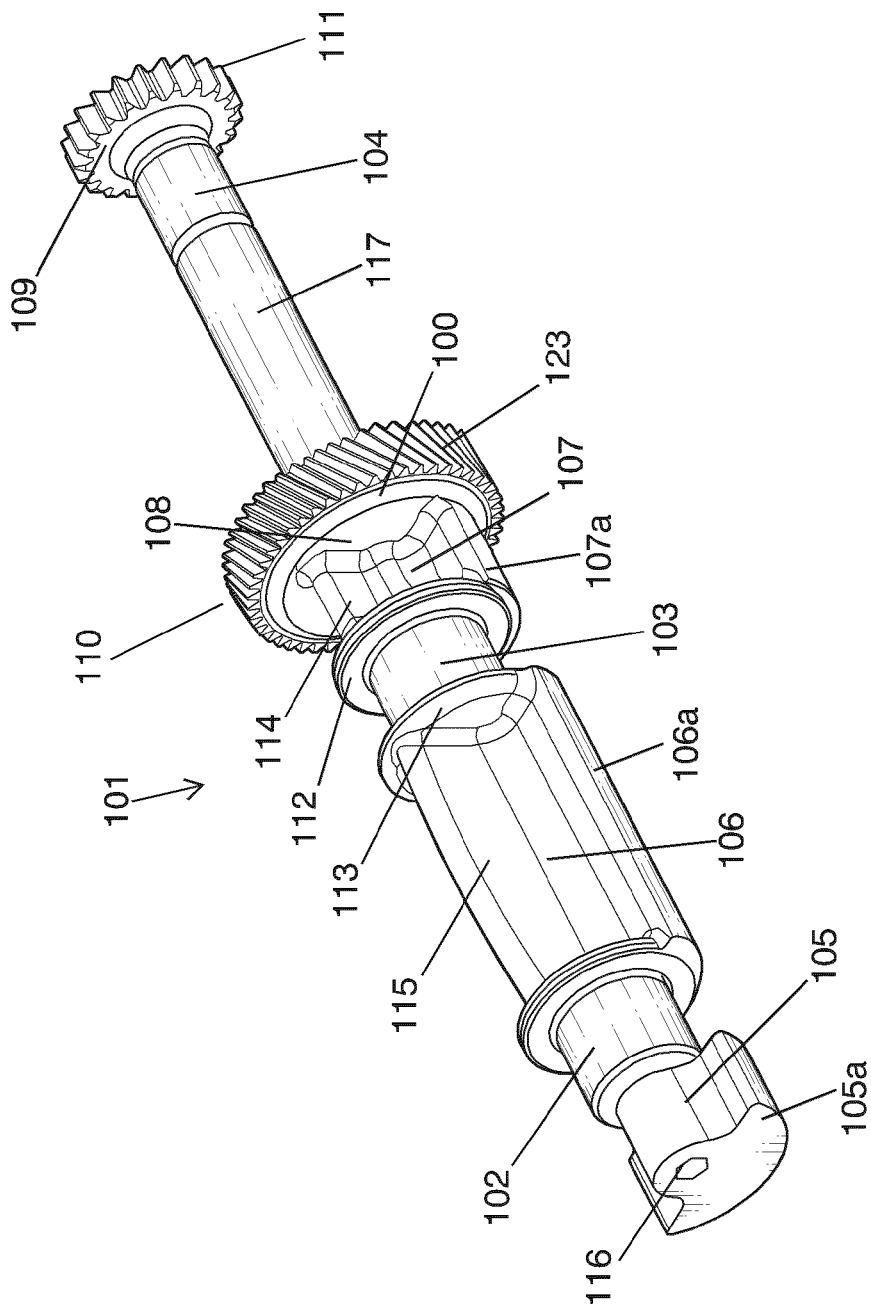
FIG. 2 is a perspective view of an alternative embodiment of a balance shaft.

An alternative embodiment of a balance shaft 101 made of nodular cast iron is shown in FIG. 2, in which the gearwheel 110 is integral with the shaft 101. The integral balance shaft 101 includes three bearing journals 102, 103, 104, three unbalanced sections 105, 106, 107, and two gearwheel sections 108, 109 having two integrally formed gearwheels 110, 111. The balance shaft 101 and the gearwheels 110, 111 preferably have the same material properties and the same material composition. The balance shaft 101 is mounted at the three bearing journals 102, 103, 104 in a bearing housing. The middle bearing journal 103 is delimited by two shoulders 112, 113. The two shoulders 112, 113 on the bearing journal 103 ensure the axial positioning of the balance shaft 101 and are used as axial bearings.

The balance shaft 101 has ribs 114, 115 on one side, in one case between the gearwheel 110 and the second bearing journal 103, and in the other case between the second bearing journal 103 and the rear bearing journal 102. The unbalanced sections 106, 107, each having an unbalanced mass 106a, 107a, are positioned opposite the ribs 114, 115. The rear unbalanced section 105 having the unbalanced mass 105a adjoins the bearing journal 102 and forms one end of the balance shaft 101 with the centering hole 116. The unbalanced masses 105a, 106a, 107a are therefore implemented in the area of approximately 180° of the balance shaft 101. In the exemplary embodiment shown, a cylindrical shaft section 117 adjoins the gearwheel section 108. It extends up to the front, first bearing journal 104, on which a further gearwheel section 109 having the gearwheel 111 (driving sprocket) is positioned, and also forms the other end of the balance shaft 101.

The balance shaft 101 shown here preferably comprises a nodular cast iron, the cast iron preferably having the above-described material properties.

It may be inferred from FIG. 2 that the integrally formed gearwheel 108 of the balance shaft 101 has a gearing, which is implemented as a helical gearing 123, i.e., the flanks of the individual teeth are inclined by a predetermined angle, preferably an angle between greater than 0° and 45°, in relation to the rotational axis of the balance shaft 101.

Figure 3:
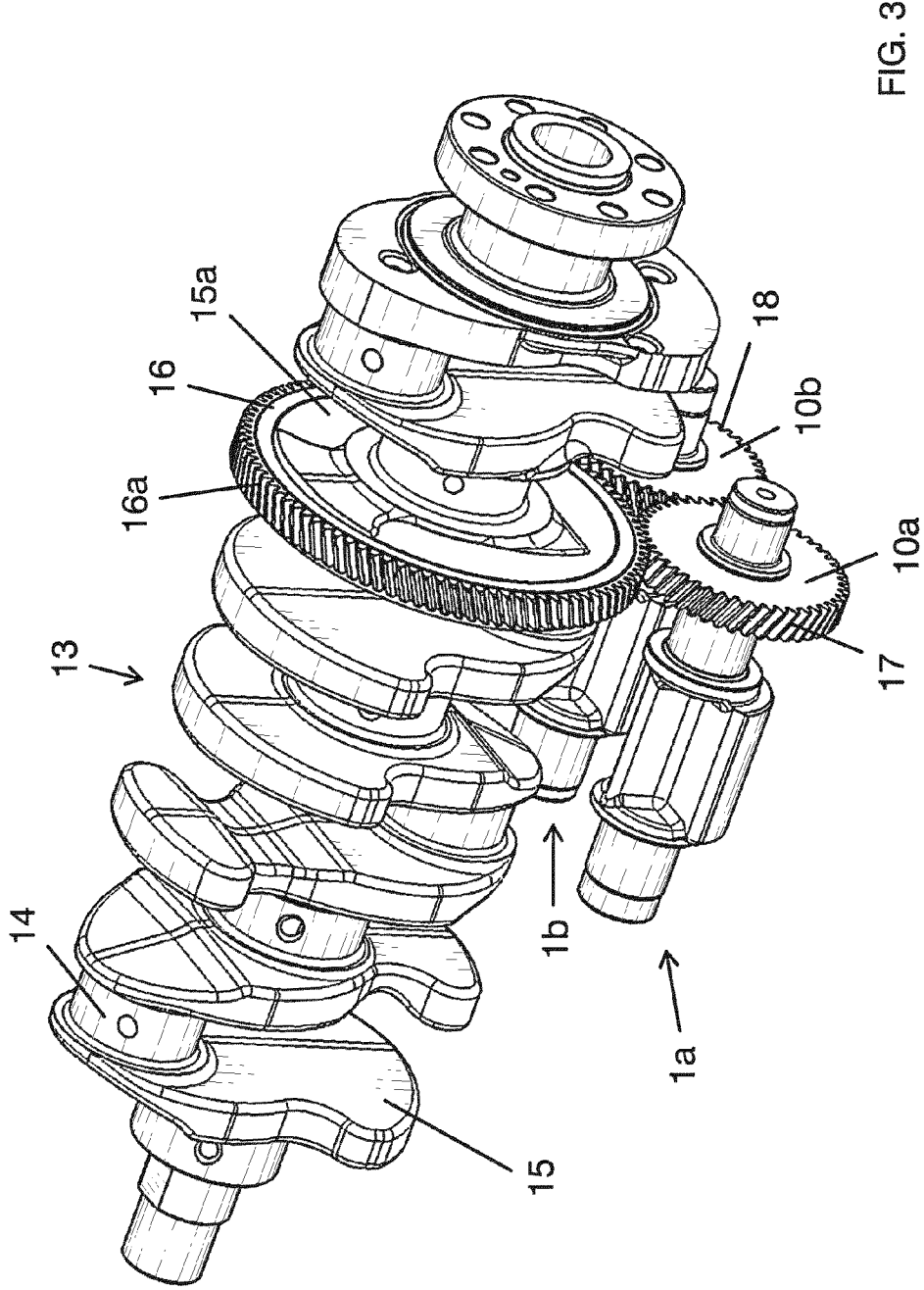
FIG. 3 is a perspective view showing a balance shaft drive using gear chain.

FIG. 3 shows a shaft arrangement 12, which comprises a crankshaft 13 of a piston engine (four-cylinder in-line engine) and two balance shafts 1a, 1b.

The crankshaft 13 has a plurality of crank pins 14, between which the crank webs 15 are positioned. One of the crank webs 15 is positioned rotationally-symmetric to the crankshaft 13. This crank web 15a carries a crankshaft gearwheel 16, which is engaged with the gearwheel 10a of the balance shaft 1a. The gearing 16a of the crankshaft gearwheel 16 is also a helical gearing which is engaged with the helical gearing 17 of the gearwheel 10*a* of the balance shaft 1*a*.

The gearwheel 10*a* of the balance shaft 1*a* engages directly in the crankshaft gearwheel 16 of the crankshaft 13. The crankshaft gearwheel 16 typically consists of inductively hardened quenched-and-tempered steel or case-hardened steel. The gearwheels 10*a* and 10*b* are connected in a rotation-locked manner to the balance shaft 1*a*, 1*b* via a press fit or other shaft-hub connections. The material of the gearwheels 10*a*, 10*b* is nodular cast iron. Because of its properties, the employed material must meet the requirements with respect to bending deformation of the teeth and Hertzian flattening of the tooth flanks, which occur due to the arising load peaks as a result of the rotational irregularity of the crankshaft 13 in combination with the mass inertias of the balance shafts 1*a*, 1*b*. In this manner, the torque peaks are damped and therefore damage to the gearwheel 10*a* of the balance shaft 1*a* and the crankshaft gearwheel 16 is reliably prevented. The balance shaft 1*a* can also consist of cast iron or steel.

Since the gearwheel 10*a* of the balance shaft 1*a* engages in the crankshaft gearwheel 16, the balance shaft 1*a* is referred to as a driving balance shaft. In this arrangement, the gearwheel 10*a* of the first balance shaft 1*a* is simultaneously engaged with the gearwheel 10*b* of the second balance shaft 1*b*, so that the second "driven" balance shaft 1*b* is driven by the first balance shaft 1*a*. It is therefore referred to as a driven balance shaft. Both gearwheels 10*a* and 10*b* on the respective balance shafts 1*a* and 1*b* have helical gearings 17, 18 which, like the gearing 16*a* of the crankshaft gearwheel 16 as well, may be implemented as an extra depth toothing ("high gearing").

The balance shafts 1*a*, 1*b*, which are positioned in the example shown below the crankshaft 13, have a height offset. This allows a space-saving wheel chain (i.e., a wheel arrangement having more than two gearwheels in a plane) comprising the three gearwheels 10*a*, 10*b*, 16, the crankshaft gearwheel 16 only being engaged with the gearwheel 10*a* of the driving balance shaft 1*a*, while the latter is also engaged with the gearwheel 10*b* of the balance shaft 1*b*. Height-offset balance shafts are used in a targeted manner in some applications in addition to the mass forces for additional partial reduction of the alternating engine torque.

In a preferred embodiment, the gearwheels 10*a*, 10*b* are produced by hobbing and subsequent generating grinding. In this manner, the required accuracies can be produced.

Alternatively, the gearings of the gearwheel 17, 18 can also be produced by hobbing and subsequent honing. The gearings of the gearwheels can particularly preferably be produced by so-called finish-milling. In an additional work step after the roughing or rough milling, fine milling is performed, so that the required precision and high accuracy may be achieved.

Figure 4:
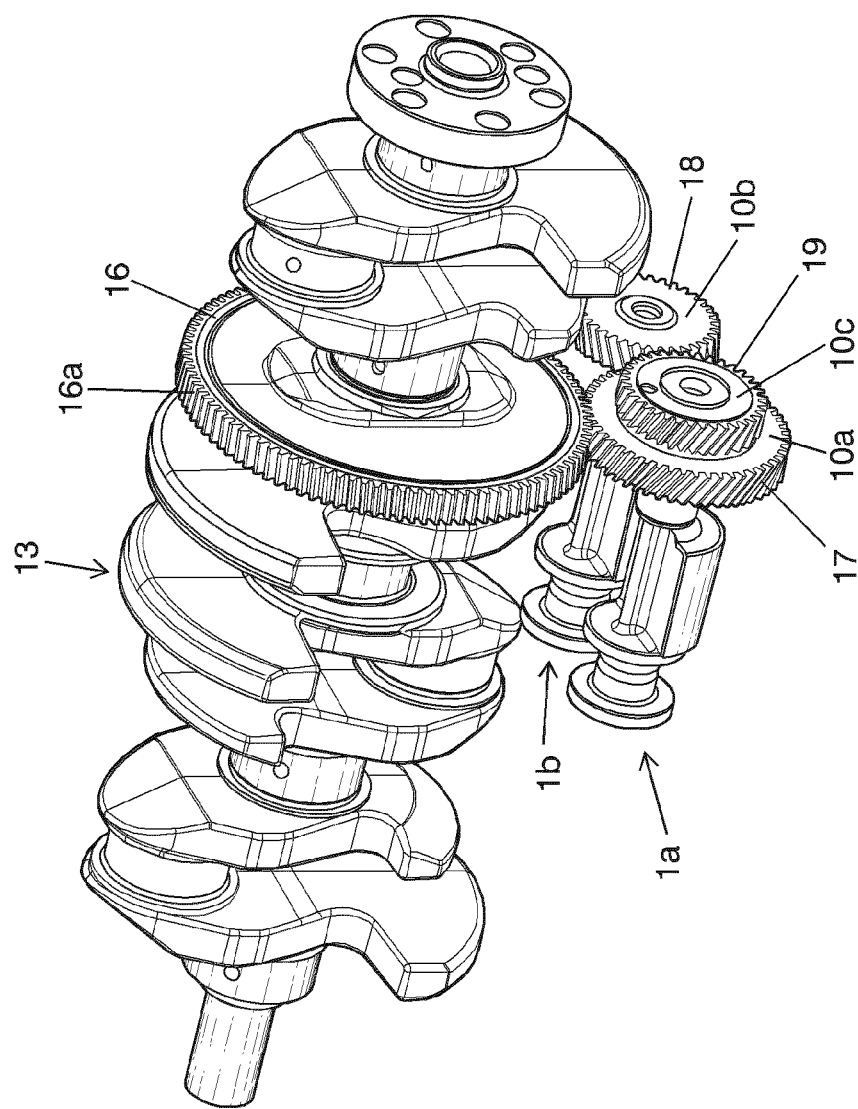
FIG. 4 is a perspective view of a balance shaft drive using two gear pairs.

FIG. 4 shows a similar shaft arrangement as in FIG. 2, but with the difference that the wheel chain, comprising three gearwheels, is replaced by two wheel pairs 10*a*, 10*b*, 10*c*, 16. The additional gearwheel 10*c* is also joined via a press fit on the driving balance shaft 1*a* and engages in the gearwheel 10*b* of the balance shaft 1*b*. The two gearwheels 10*b*, 10*c* are also referred to as a synchronous stage. The term "synchronous stage" is understood as a gearing which has a 1:1 transmission ratio.

Figure 5:
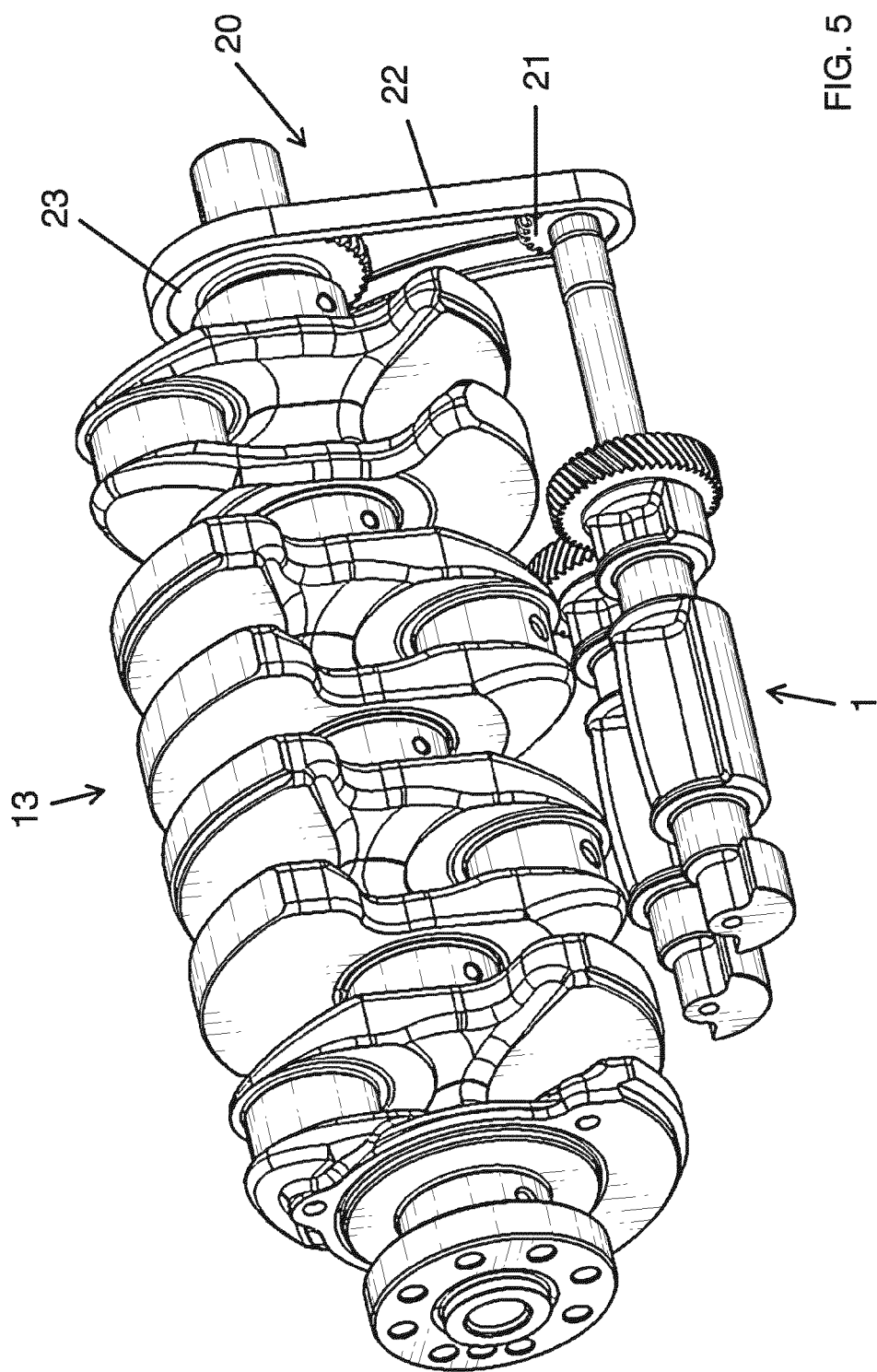
FIG. 5 is a perspective view showing a balance shaft drive using a chain drive.

A further application of the balance shaft corresponding to FIG. 1 is shown in FIG. 5. FIG. 5 shows a drive of balance shafts via a chain drive 20, as is also used in piston engines. A sprocket 21, which is connected in a formfitting or friction-locked manner to the balance shaft 1, is driven through a chain 22, which wraps around the sprocket 21, by a sprocket 23 located on the crankshaft 13.

Figure 6:
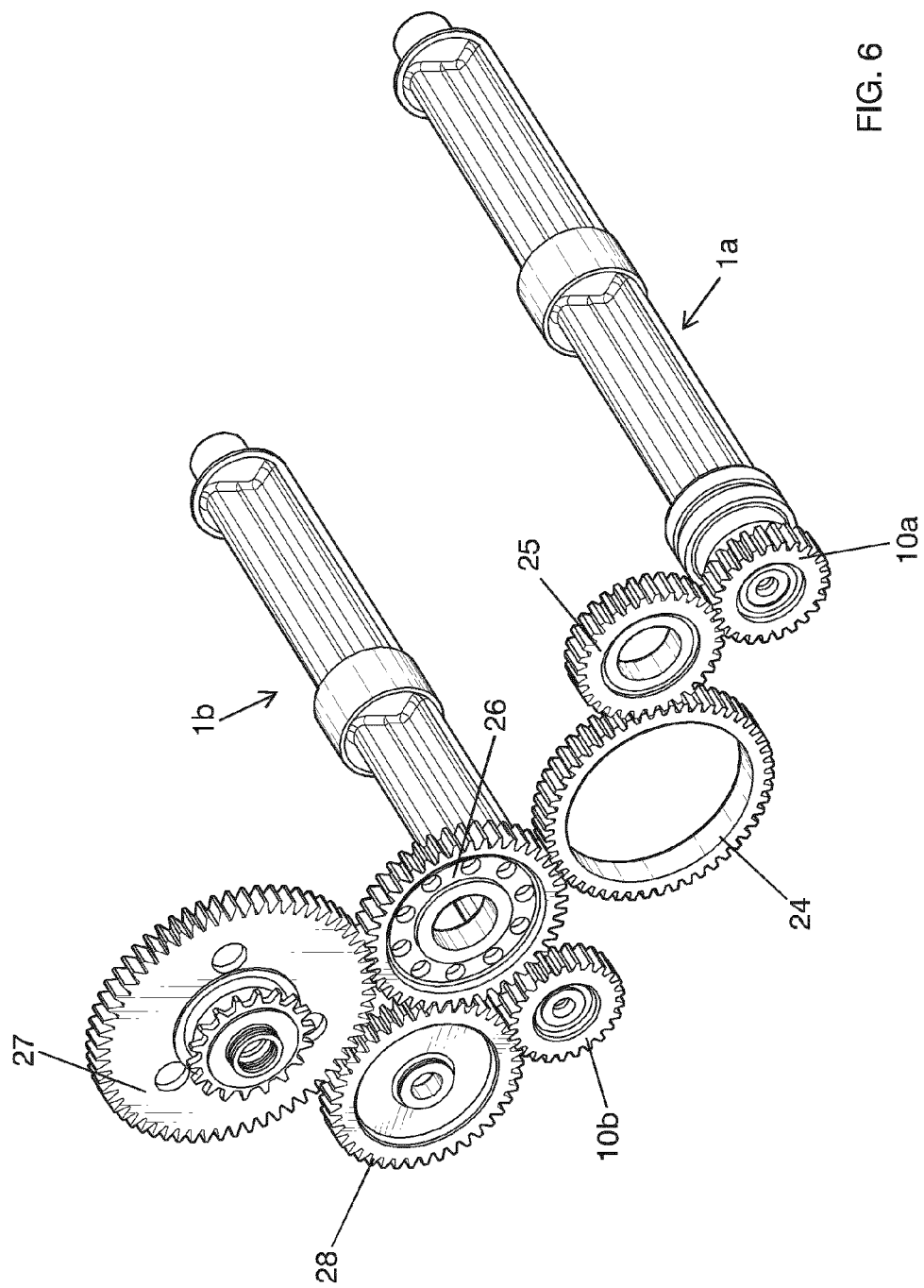
FIG. 6 is a perspective view of a balance shaft drive using a gear chain via intermediate wheels and secondary assembly drive wheels.

A further application of balance shafts 1*a*, 1*b* is shown in FIG. 6. FIG. 6 shows the gearwheel drive for secondary assemblies and camshafts of a piston engine. The illustration is partially shown without the associated shafts for reasons of clarity. The crankshaft gearwheel 24 is used as a drive wheel for an intermediate gearwheel 25, which is positioned between the crankshaft gearwheel 24 and the gearwheel 10*a* of the balance shaft 1*a*.

Furthermore, the crankshaft gearwheel 24 engages in an intermediate gearwheel 26, which drives the gearwheels 27, 28 of secondary assemblies (not shown). The drive of the gearwheel 10*b* of the second balance shaft 1*b* is performed starting from the crankshaft wheel 24 via the wheel chain of the gearwheels 26, 28.

Balance shafts can thus also be driven via other gearwheels which engage in a crankshaft gearwheel 16, 24. The position of a driving crankshaft gearwheel 16, 24 can then be located within a wheel drive for driving secondary assemblies and valve drive or on a crank web 15 depending on the concept.

Figure 7:
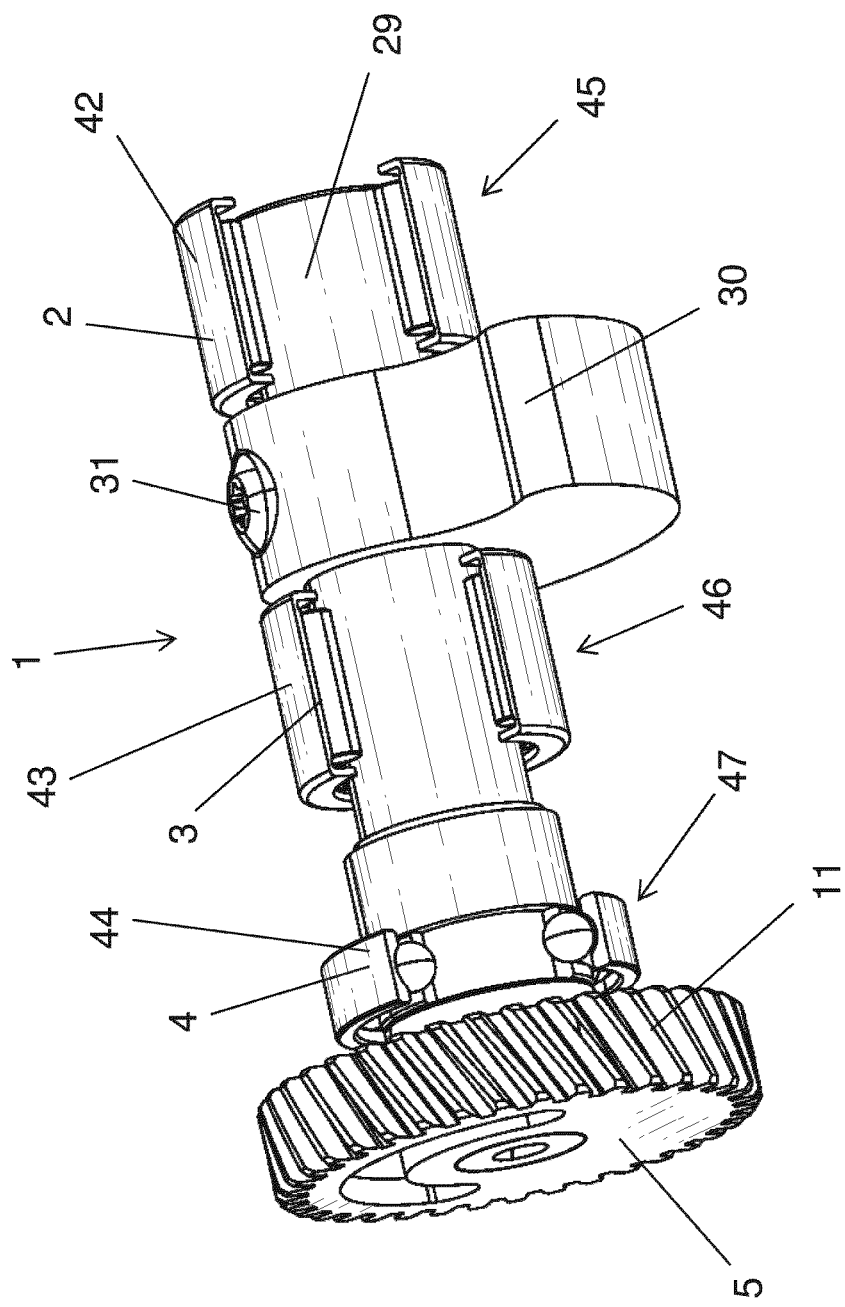
FIG. 7 is a perspective view showing a balance shaft in a constructed embodiment.

A further application of the balance shaft 1 corresponding to FIG. 1 is shown in FIG. 7. FIG. 7 shows a cylindrical shaft 29 of equal diameter, on which an unbalanced mass 30 is fastened using machine elements 31. The balance shaft 1 is mounted at three points using the bearings 2, 3, 4, which are implemented as roller bearings 42, 43, 44. The bearings are shown in partial section. The two roller bearings 42, 43 on both sides of the unbalanced mass 30, which are implemented as two needle bearings 45, 46, are used to absorb the unbalanced forces. The (preferably unhardened) gearwheel 5 made of nodular cast iron is fixed via a press fit on the front end of the balance shaft 1. The axial forces occurring due to the helical gearing 11 are absorbed by a ball bearing 47 of the bearing 4, which is installed axially behind the gearwheel 5.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. Apparatus for a piston engine, comprising:
   a balance shaft having an unbalanced section in which an unbalanced mass is positioned;
   a bearing journal on which the balance shaft is supported in a bearing; and
   the balance shaft further comprising a gear section on which a gear is fastened in a rotation-locked manner with the balance shaft;
   wherein the gear is produced from nodular cast iron and the gear comprises an unhardened gearing, wherein the nodular cast iron has a fracture elongation of at least 4%.

2. The apparatus of claim 1, wherein the gear is fastened via a press fit or other shaft-hub-connection on the balance shaft.

3. The apparatus of claim 1, wherein the balance shaft is mounted using the bearing journal via friction bearings or roller bearings.

4. The apparatus of claim 1, wherein the balance shaft is produced from steel.

5. The apparatus of claim 1, wherein the balance shaft is produced from the same material as the gear.

6. The apparatus of claim 5, wherein the balance shaft and the gear are integrally formed.

7. The apparatus of claim 5, wherein the balance shaft is unhardened.

8. The apparatus of claim 1, wherein the gear and/or the balance shaft comprise cast iron having a carbon component of 2.9 to 3.8 mass percent.

9. The apparatus of claim 1, wherein the gear and/or the balance shaft comprise cast iron having a carbon component of 3.20 to 3.70 mass percent.

10. The apparatus of claim 1, wherein the gear and/or the balance shaft comprise cast iron having a carbon component of 3.35 to 3.65 mass percent.

11. The apparatus of claim 1, wherein the gear and/or the balance shaft comprise cast iron having a silicon component of 1.5 to 3.5 mass percent.

12. The apparatus of claim 1, wherein the gear and/or the balance shaft comprise cast iron having a silicon component of 2.2 to 3.5 mass percent.

13. The apparatus of claim 1, wherein the gear and/or the balance shaft comprise cast iron having a silicon component of 2.5 to 3.3 mass percent.

14. The apparatus of claim 1, wherein the gear and/or the balance shaft comprise cast iron, which has a manganese component of less than 0.5 mass percent.

15. The apparatus of claim 1, wherein the gear and/or the balance shaft comprise cast iron, which has a manganese component of 0.15 to 0.3 mass percent.

16. The apparatus of claim 1, wherein the gear and/or the balance shaft comprise cast iron, which has a phosphorus component of at most 0.05 mass percent.

17. The apparatus of claim 1, wherein the gear and/or the balance shaft comprise cast iron, which has a phosphorous component of at most 0.03 mass percent.

18. The apparatus of claim 1, wherein the gear and/or the balance shaft comprise cast iron which has a copper component of 0.5 to 1.1 mass percent.

19. The apparatus of claim 1, wherein the gear and/or the balance shaft comprise cast iron which has a microstructure which has a perlite component of at least 60% and a ferrite component of at most 40%.

20. The apparatus of claim 1, wherein the gear and/or the balance shaft comprise cast iron which has a microstructure which has a perlite component of 80 to 90% and a ferrite component of 10% to 20%.

21. The apparatus of claim 1, wherein the gear and/or the balance shaft comprise cast iron which includes spheroidal graphite particles and whose microstructure is such that the greatest dimension of the spheroidal graphite particles is less than 0.12 mm.

22. The apparatus of claim 21, wherein the greatest dimension of the spheroidal graphite particles is less than 0.08 mm.

23. The apparatus of claim 22, wherein the greatest dimension of the spheroidal graphite particles is less than 0.06 mm.

24. The apparatus of claim 1, wherein the gear has gearings having a dedendum factor of at least 1.25 and an addendum factor of at least 1.0.

25. The apparatus for a piston engine of claim 1, wherein the gear and/or the balance shaft comprise cast iron which has a microstructure which has a ferrite component of at most 40%.

26. The apparatus for a piston engine of claim 1, wherein the gear and/or the balance shaft is comprised of a material having at least one of (1) a tensile strength of at least 600 N/mm$^2$ or (2) a yield strength of at least 380 N/mm$^2$.

27. The apparatus for a piston engine of claim 1, wherein the gear and/or the balance shaft is comprised of a material having (1) a tensile strength of at 600 N/mm$^2$, (2) a yield strength of at least 380 N/mm$^2$, and (3) a fracture elongation of at least 4%.

28. The apparatus for a piston engine of claim 1, wherein the nodular cast iron has a fracture elongation of 8% to 10%.

29. The apparatus for a piston engine of claim 1, wherein the gear and/or the balance shaft is comprised of a material having (1) a tensile strength of at 700 N/mm$^2$, (2) a yield strength of at least 440 N/mm$^2$, and (3) a fracture elongation of at least 8% to 10%.

30. A piston engine, comprising:
a crankshaft;
a balance shaft driven by the crankshaft, the balance shaft having an unbalanced section which carries an unbalanced mass, the balance shaft further comprising a gear section on which a gear is connected in a rotation-locked manner to the balance shaft; and
a bearing journal on which the balance shaft is mounted;
wherein the gear is produced from nodular cast iron and the gear comprises an unhardened gearing, wherein the nodular cast iron has a fracture elongation of at least 4%.

31. The apparatus for a piston engine of claim 30, wherein the gear and/or the balance shaft comprise cast iron which has a microstructure which has a ferrite component of at most 40%.

32. The apparatus for a piston engine of claim 30, wherein the gear and/or the balance shaft is comprised of a material having at least one of (1) a tensile strength of at least 600 N/mm$^2$ or (2) a yield strength of at least 380 N/mm$^2$.

33. The apparatus for a piston engine of claim 30, wherein the gear and/or the balance shaft is comprised of a material having (1) a tensile strength of at 600 N/mm$^2$, (2) a yield strength of at least 380 N/mm$^2$, and (3) a fracture elongation of at least 4%.

34. The apparatus for a piston engine of claim 30, wherein the nodular cast iron has a fracture elongation of 8% to 10%.

35. The apparatus for a piston engine of claim 30, wherein the gear and/or the balance shaft is comprised of a material having (1) a tensile strength of at 700 N/mm$^2$, (2) a yield strength of at least 440 N/mm$^2$, and (3) a fracture elongation of at least 8%-10%.

* * * * *